Feb. 23, 1926. 1,574,182
E. G. BALSTAD
MARKING GAUGE
Filed Feb. 24, 1925
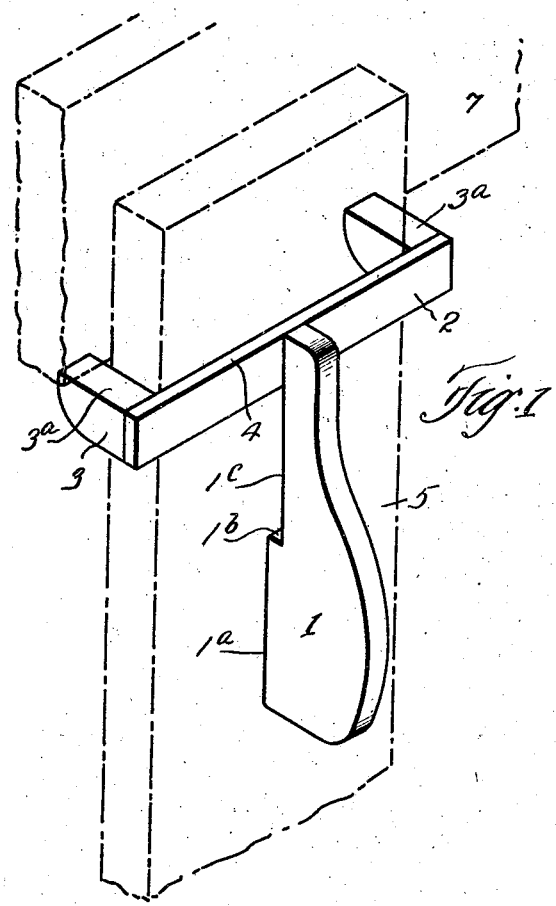
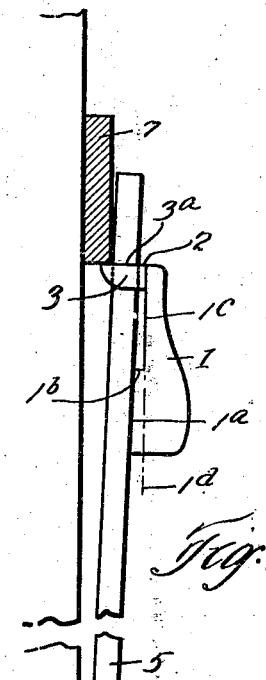
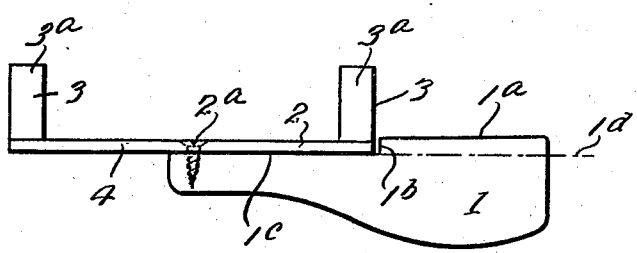
Inventor
Emil G. Balstad
By Hull, Brock & ____
Attys.

Patented Feb. 23, 1926.

1,574,182

UNITED STATES PATENT OFFICE.

EMIL G. BALSTAD, OF EAST CLEVELAND, OHIO.

MARKING GAUGE.

Application filed February 24, 1925. Serial No. 11,056.

*To all whom it may concern:*

Be it known that I, EMIL G. BALSTAD, a citizen of the United States, residing at East Cleveland, in the county of Cuyahoga and State of Ohio, have invented a certain new and useful Improvement in Marking Gauges, of which the following is a full, clear, and exact description, reference being had to the accompanying drawings.

This invention relates to marking gauges and, while capable of general use, is directed more particularly to gauges for marking casing for doors, windows and the like.

The primary object of the invention is to provide a particularly simple and inexpensive form of gauge by means of which the mechanic is enabled quickly and accurately to mark the casing of a door or the like so that the same may be properly cut to insure an accurate and close fit.

Another object of the invention is to provide a gauge of the aforesaid character which shall be self-aligning in use and hence require no adjustments.

With these and other objects in view, the invention consists in the various novel features of construction and the arrangement or combinations thereof, all of which will be fully described hereinafter and pointed out in the appended claims.

In the drawing accompanying and forming part of this application Fig. 1 is a perspective view of my gauge illustrating the use of the same for marking the casing of a door; Fig. 2 is a vertical sectional view through a door frame and showing my gauge applied to the casing; and Fig. 3 is a side elevation of the gauge when folded.

Describing the various parts by reference characters, 1 denotes the base or handle of my gauge which is pivotally connected to the central portion of a marking bar 2, as by means of a screw $2^a$. Projecting from each end of the bar 2 is a stop projection 3. For convenience of description, the gauge will be assumed to be used with the parts in the positions shown in Figs. 1 and 2, with the handle depending from the bar and the marking edge 4 at the top of the gauge, and the terms "top" and "bottom", and "upper" and "lower" will be employed hereinafter in referring to the positions of the parts, but without any intention thereby to limit the gauge to any particular position or in use with any particular arrangement of the object or objects with which it is to be employed.

The stops 3 project from the opposite side of the bar 2 from that to which the handle 1 is attached and have their upper surfaces $3^a$ flush with the upper or marking edge 4 of said bar and extending at right angles therefrom. The handle 1 is provided with an offset base portion having a face $1^a$ making an angle of slightly greater than 90° with a plane including the marking edge 4 and the faces $3^a$ of the stop blocks.

The offset portion referred to includes a shoulder $1^b$, which shoulder is so located as to enable the handle or base 1 to be swung at right angles to the position which it occupies in Figs. 1 and 2, with the shoulder clearing an adjacent stop block 3, the portion of the marking bar between the screw 3 and the block resting against the face $1^c$ on said handle or base. The face $1^c$ is preferably in a plane at right angles to the surfaces $3^a$ and 4; and the inclination of the plane of the surface $1^c$ to the face $1^a$ and hence to the plane of the surfaces $3^a$ and 4 as indicated in Figs. 2 and 3 by the dotted-line extension $1^d$ of the surface $1^c$. This arrangement not only allows the gauge to be folded into a convenient form for shipment, as shown in Fig. 3, but also enables it to be operated effectively in connection with the marking of the casing or other object with which it is to be used.

In the drawings, I have shown my gauge in use for marking a casing member 5 for a door frame. This member is shown as supported temporarily at its bottom upon the bottom member 6 of the door frame, while its upper end is swung against the upper member 7 of said frame. The blocks 3 are spaced apart a sufficient distance to enable them to be slipped over the edges of the member 5, and my gauge is then pushed upwardly by means of the handle or base 1 until the inner ends of the blocks contact with the bottom of the member 7. Due to the inclination of the surface $1^a$ of the handle, which is resting against the casing member 5, the marking edge of the part 4 will be slightly higher than would be the case if the parts $3^a$ and 4 were in a plane at right angles to member 5. This will allow the mechanic to saw off the casing member 2 along the line made by a pencil or other mark drawn along the edge 4, and this requires the casing member to be sprung into place, under some compression, between the parts 6 and 7, ensuring a close fit. By providing an extended surface 1ª for engagement with the casing member 5, the positions of the parts 3ª and 4 will not be affected by small depressions, such as plane marks, in said member as the surface 1ª will extend across the same.

The pivoting of the handle not only enables it to be folded, as indicated in Fig. 3; but this arrangement allows the bar and the projections 3 to adjust themselves with reference to the handle when the said projections encounter a cross member 7, it being understood that the blocks or projections 3 will be spaced apart a sufficient distance to provide some clearance for the edges of the casing members 5. Obviously, the lower edge of the member 7 need not be exactly level or horizontal to enable my gauge to function, as the self-adjusting feature of the same will accommodate all ordinary variations from plumb or level conditions.

The gauge referred to herein is particularly applicable for work of the character referred to and is extremely efficient in operation. Furthermore, as will be evident, it is simple in construction and economical of production.

Having thus described my invention, what I claim is:—

1. A marking gauge for the frames of door casings and the like comprising a marking bar having a marking edge and a pair of projections carried by said bar and adapted to be applied to opposite edges of the board to be marked and to project beyond said board thereby to engage the edge of the board or object to which the first mentioned board is to be fitted, a handle pivoted centrally of said bar having a cutaway portion for allowing the handle to be folded to a position parallel to the marking edge.

2. A marking gauge for the frames of door casings and the like comprising a marking bar having a marking edge and a pair of co-planar projections carried by said bar and adapted to be applied to opposite edges of the board to be marked and to project beyond said board thereby to engage the edge of the board or object to which the first mentioned board is to be fitted, the marking edge of said bar and the upper surfaces of said projections being in the same plane, a handle pivoted centrally of the outer face of said bar, having a cut-away portion and a straight portion, said straight portion being cut at an angle to said cut-away portion.

3. A marking gauge for the frames of door casings and the like comprising a marking bar having a marking edge and a pair of co-planar projections carried by said bar and adapted to be applied to opposite edges of the board to be marked and to project beyond said board thereby to engage the edge of the board or object to which the first mentioned board is to be fitted, the marking edge of said bar and the upper surfaces of said projections being in the same plane, and an operating handle pivoted centrally on said bar, the inner edge of said handle being cut at an angle, whereby the marking edge of said bar will rest at an acute angle to the board when the gauge is applied to the face of the board.

4. A marking gauge for the frames of door casings and the like comprising a marking bar having a marking edge and a pair of projections carried by said bar and adapted to be applied to opposite edges of the board to be marked and to project beyond said board thereby to engage the edge of the board or object to which the first mentioned board is to be fitted, and a base or handle pivoted to said bar and having its bar-facing edge provided with a recess adapted to receive therein the portion of the bar between the central portion and one end thereof when the said base or handle is swung into line with such bar, the said base or handle having a projection beyond said recess adapted to engage the face of the board with which it is used.

5. A marking gauge for the frames of doors and the like comprising a marking bar having a marking edge, projections carried by said bar and adapted to receive therebetween the board to be marked and to engage a member arranged at an angle to such board, each projection having a surface extending from and in the plane of the marking edge of said bar, a handle pivotally connected with the said bar and having an extended surface adapted to engage the surface of the board along which the bar and its projections are moved, the said surface being arranged to tilt the bar, whereby the plane of the marking edge of said bar and of the surfaces of the projections will be other than at right angles to the plane of the face of the object along which the gauge is moved.

In testimony whereof, I hereunto affix my signature.

EMIL G. BALSTAD.